United States Patent [19]

Morin et al.

[11] Patent Number: 5,299,041
[45] Date of Patent: Mar. 29, 1994

[54] ACTIVE MATRIX, HIGH DEFINITION, LIQUID CRYSTAL DISPLAY STRUCTURE

[75] Inventors: Francois Morin, Lannion; Yannick Chouan, Louannec; Bruno Vinouze, Port-Blanc, all of France

[73] Assignee: France Telecom Etablissement autonome de droit public, France

[21] Appl. No.: 911,013

[22] Filed: Jul. 9, 1992

[30] Foreign Application Priority Data

Jul. 11, 1991 [FR] France .................. 91 08752

[51] Int. Cl.⁵ .................................. G02F 1/133
[52] U.S. Cl. .......................... 359/59; 359/67; 359/68; 359/74
[58] Field of Search ............ 359/54, 59, 67, 68, 359/74, 79; 340/719, 784

[56] References Cited

U.S. PATENT DOCUMENTS

| | | | |
|---|---|---|---|
| 4,654,117 | 3/1987 | Aoki et al. | 359/68 |
| 4,723,838 | 2/1988 | Aoki et al. | 359/67 |
| 4,775,549 | 10/1988 | Ota et al. | 427/38 |
| 4,776,673 | 10/1988 | Aoki et al. | 359/59 |
| 5,162,875 | 11/1992 | Birkle et al. | 257/63 |

FOREIGN PATENT DOCUMENTS

| | | |
|---|---|---|
| 0271313 | 6/1988 | European Pat. Off. . |
| 2638880 | 5/1990 | France . |
| 0045219 | 3/1985 | Japan .................. 359/67 |
| 62-105123 | 10/1987 | Japan . |

OTHER PUBLICATIONS

Applied Physics Letters., vol. 57, No. 22, 26 Nov. 1990, New York, US, pp. 2288-2290; B. Singh et al.: "Use of Black Diamond-Like Carbon Films As A Contrast Enhancement Layer For Liquid-Crystal Displays".
SID 87 International Symposium, Digest of Technical Papers, 1987, New York, US, pp. 379-382; W. J. Latham: "A New Class Of Color Filters For Liquid-Crystal Displays".

*Primary Examiner*—William L. Sikes
*Assistant Examiner*—Huy Mai
*Attorney, Agent, or Firm*—Pearne, Gordon, McCoy & Granger

[57] ABSTRACT

This color display structure for color display purposes has a first and second spaced, transparent substrates, between which is interposed a liquid crystal film (6), the first substrate (2) essentially supporting color filters (124) resistant to high temperatures and separated by black matrixes (126), a first transparent, passivating layer (128) deposited on the entire surface occupied by the filters and the black matrixes, thin film transistors (8, 9), formed on the first passivating layer facing the black matrixes so as to be protected from the ambient light, first transparent capacitor plates (10) formed on the first passivating layer facing the color filters and connected to the transistors, electrode rows (14) and columns (12) for controlling these transistors and a second transparent passivating layer (20) covering the transistors, the first plates, the rows and the columns, the second substrate (4) essentially having the second transparent capacitor plate.

7 Claims, 3 Drawing Sheets

ACTIVE MATRIX, HIGH DEFINITION, LIQUID CRYSTAL DISPLAY STRUCTURE

BACKGROUND OF THE INVENTION

1. Field of the Invention

The present invention relates to a novel liquid crystal display (LCD) structure and to an active matrix based on thin film transistors (TFT) and capacitors, especially adapted to producing high resolution, flat-faced display screens. These flat screens can be used as large, colour television screens, as colour computer terminal screens, with direct viewing, or as a black and white, generally small size projecting screen.

2. Description of the Related Art

In such screen or display types, an electronic memory formed from pixels distributed over the entire surface of the screen stores the video signal for the duration of the image. The liquid crystal in contact with each pixel is excited for the duration of one image. Each pixel is constituted by one or two TFT's and one or two capacitors, the liquid crystal forming the dielectric of one of them. Moreover, these screen or display structures are constituted by two glass plates kept spaced from one another and each having precise patterns between which is interposed the liquid crystal.

The attached FIGS. 1 and 2 diagrammatically show an active matrix, colour display screen structure according to the prior art. FIG. 1 is a longitudinal sectional view and FIG. 2 a perspective view of part of the lower plate of the screen without the layer for passivating and orienting the liquid crystal.

In these drawings, references 2 and 4 respectively indicate the lower and upper, transparent support plates for the screen and reference 6 indicates the liquid crystal.

According to the prior art, the lower plate 2 (FIG. 2) supports on its inner face thin film transistors 8, 9 of each pixel. The transparent electrodes 10 of said pixels form the lower plate of the capacitors. The columns 12 and rows 14 of electrodes control the transistors 8 and 9.

Each addressing column 12 is provided with a bend 16 and each plate 10 is provided with a finger 18. The intersections of the row 14 with the column 12 and the bend 16 define drains D and D' of the transistors 8 and 9 and the intersection of the row 14 with the finger 18 defines the source of said transistors. Those parts of the row 14 respectively located between the column 12 and the finger 18 and the bend 16 and the finger 18 constitute the gates of the transistors 8 and 9.

This assembly is covered with a silicon nitride passivating layer 20 and optionally a liquid crystal orientation layer 22 (FIG. 1).

The upper glass plate 4 has on its inner face colour filters 24 separated by a black matrix 26. These filters are alternately red R, green V and blue B.

These colour filters and the black matrix 26 are covered with a transparent, conductive layer 28 serving as the counterelectrode and in particular the upper electrode for the capacitors. The electrodes 10 and 28 are generally made from indium and tin oxide (ITO). The counterelectrode 28 can also be covered with a layer 29 for aligning the liquid crystal molecules.

A screen structure as shown in FIGS. 1 and 2 is in particular described in SID 84 Digest, pp 308-311 by Y. Ugai et al entitled "Diagonal colour LCD addressed by a-Si TFT'S".

On assembling the screen, the two glass plates 2 and 4 must be positioned facing one another, so that the transparent electrodes 10 defining the pixels are perfectly superimposed on the colour filters 24. Following this positioning, the two plates 2 and 4 are sealed at their periphery with the aid of an adhesive joint 30 and liquid crystal filling of the display cell takes place.

Each of the two screen plates 2 and 4 has very precise patterns. Thus, the spacing of the pixels and therefore the colour filters is typically 0.2 mm. Moreover, each pixel is electrically defined by the electrode 10 of the plate 2 supporting the TFT's and optically by the colour filter 24 surrounded by the black matrix formed under the counterelectrode 28.

In order to bring about a maximum reduction in the width 1 of the black matrix between two consecutive filters and therefore increase to the greatest possible extent the transparency of the screen, a superimposing accuracy of the two plates of ±3 μm is sought. However, these two glass plates are known to have a different thermal history during their manufacture.

As is known, glass undergoes a more or less random compaction causing geometrical variations which can reach several micrometers, i.e. more than 10 μm, as a function of the nature of the glass and the temperatures used (particularly for layer deposition).

In this case, the precise superimposing of two glass plates having very precise patterns becomes problematical for large sizes.

This problem of the precise positioning of two glass plates occurs in all screen structures in which the filters and pixels are respectively produced on two support plates and in particular in the structure described in EP-A-179 915.

Moreover, when using the process for the production of a display screen having "two masking levels", as described in FR-A-2 533 072, the transistors 8, 9, as well as the addressing rows 14 are constituted by a stack of an amorphous hydrogenated silicon layer 32, a silicon nitride layer 34 and an aluminium layer 36 in photoetched form. In this type of "gates on top" screen, the lower face of the semiconductor 32 is in direct contact with the glass and is not protected against light.

Although illumination generally takes place through the rear or the upper face, as indicated by the arrows F in FIG. 1, the "bulge" of the TFT'S (or lower faces in contact with the substrate) is exposed to ambient observation light. Furthermore, when said light is intense, a photocurrent is produced in the semiconductor leading to leakage currents in the transistors, which may limit the performance characteristics of the screen and in particular reduce its contrast.

In order to obviate this disadvantage, consideration has been given to the production of a black matrix made from black polyimide below the "bulge" of the transistors, as described in FR-A-2 638 880. However, in this type of screen, the problem of the precise positioning of the colour filters and the electrodes 10 of "pixels" is not solved. This problem of positioning two substrates also exists in the smaller screens used for projection purposes.

SUMMARY OF THE INVENTION

The invention also relates to a novel active matrix, liquid crystal colour screen structure making it possible to obviate the disadvantages indicated hereinbefore. In particular, said screen structure makes it possible to ensure that the assembly of two transparent substrates, each equipped with their patterns, is not critical and can take place very rapidly.

Therefore the invention is applicable to high definition, large or small screens or displays, i.e. those having spacings of the pixels and possibly colour filters of 0.2 mm and even less. Moreover, the electrical performance characteristics of said screen are improved compared with those of the prior art.

In the case of large, high definition colour screens, the invention relates to an active matrix, liquid crystal screen structure having a first and a second transparent substrates kept spaced from one another and between which is interposed a liquid crystal film, the first substrate essentially supporting colour filters resistant to high temperatures and separated by black matrixes, a first transparent, passivating layer deposited on the entire surface occupied by the filters and the black matrixes, thin film transistors formed on the first passivating layer facing the black matrixes so as to be protected from the ambient light, first transparent, capacitor plates, formed on the first passivating layer facing the colour filters, each first plate being connected to a thin film transistor, electrode rows and columns for controlling said transistors and a second transparent, passivating layer covering the transistors, the first plates, the rows and the columns, the second substrate essentially having the second transparent capacitor plate, said second plates facing the first capacitor plates.

The term "filters resistant to high temperatures" is understood to means filters able to resist a temperature of at least 180° C.

A particular application of the invention is black and white projecting screens. In this case, the liquid crystal screen does not have colour filters, but only a "black grid" which, as in all other screen types, protects the transistors against light and masks the parts which are not optically useful in order to improve contrast.

In this case, the first substrate supports a black matrix in the form of a "black grid", a first transparent, passivating layer deposited on the entire surface of the first substrate and therefore on the optical mask, thin film transistors formed on the first passivating layer facing the black matrixes so as to be protected from the ambient light, first transparent capacitor plates, formed on the first passivating layer outside the regions occupied by the "black grid", each first plate being connected to a thin film transistor, electrode rows and columns for controlling said transistors and a second transparent, passivating layer covering the transistors, the first plates, the rows and the columns.

As previously, the second substrate essentially comprises the second transparent capacitor plate, said second plates facing the first plates of the capacitors.

Generally, the control columns and rows are positioned facing the black matrixes or "black grid".

Bearing in mind the very high light flow levels used in this application, the black matrix must be as reflective as possible in order to avoid any TFT heating. It is therefore advantageously produced from a bright metal, e.g. chromium or aluminium (0.2 μm), isolated from the TFT by a thick dielectric layer.

The introduction of a metal "black matrix" below the transistors and possibly below the rows and columns, leads to an increase in the capacity of the rows and columns. In the case of large screens this is a handicap, because then the propagation time of the control signals in the access network to the TFT's becomes long. It is for this reason that, in large screens, the "black grid" is advantageously made from an electrically insulating material, e.g. a black polymer.

Conversely, in small screens, like those used for projection, which normally have the size of a slide 24×36 or slightly larger, this access time phenomenon is negligible and the solution proposed satisfactory. It should also be noted that, in this case, the small possible overlap of the "black matrix" and the pixel (typically 1 to 2 μm on the periphery of the pixel) constitutes a storage capacity, whose presence improves the behaviour of the screen at high temperatures.

According to the invention, all the precise elements of the screen, such as the pixels, thin film transistors, colour filters and black matrixes or "black grid" (in the grid direction) are produced on the same transparent substrate. Therefore the second screen substrate now has the sole function of being equipped with a conductive layer serving as a counterelectrode and of being transparent. Advantageously, said counterelectrode is constituted by a continuous, transparent plate covering most of the inner face of the substrate.

Therefore the two screen substrates can be rapidly assembled, the precise reciprocal positioning of the two substrates no longer occurring.

Moreover, the precise positioning of all the elements of the screen on the same substrate does not cause problems and the precise alignment between the colour filters and the first capacitor plates for colour screens is better than the ±3 μm of the prior art. Thus, the transparency level of the screen is higher than in the prior art structures.

Thus, the superimposing of the colour filters and the first capacitor plates can take place with a mask or matrix aligning means identical to that used for producing thin film transistors.

Moreover, as the thin film transistors are produced on black matrixes or black grids, the latter are totally protected from ambient light, which in the case of producing said transistors from amorphous hydrogenated silicon leads to a leakage current reduction in the transistors, thereby improving the screen performance characteristics.

Advantageously, the colour filters are in the form of blocks defining with the black matrixes a relief-free, uniform grid on which the rows and columns of the active matrix and the transistors are produced in an optimum manner.

However, it is possible if the method of producing the colour filters leads to a completely planar surface, to use colour filters in the form of parallel strips.

The black matrixes can be made from metal for small screens or polymer for large screens, e.g. black polyimide. When the black matrixes are made from polymer, the latter must be able to withstand temperatures exceeding 180° C.

Moreover, the transistors are in particular of the "gate on top" type.

The invention is described in greater detail hereinafter relative to non-limitative embodiments and the attached drawings, wherein show:

DETAILED DESCRIPTION OF THE PREFERRED EMBODIMENTS

Figure 1:
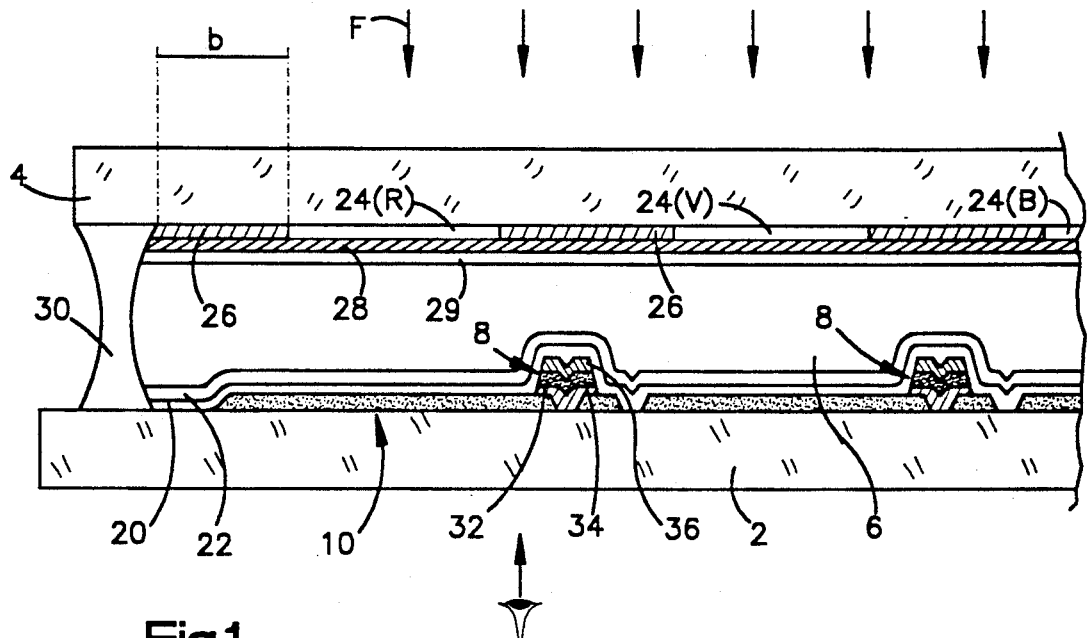
FIGS. 1 and 2, already described, diagrammatically in section and in part plan view a colour screen structure according to the prior art.
Figure 2:
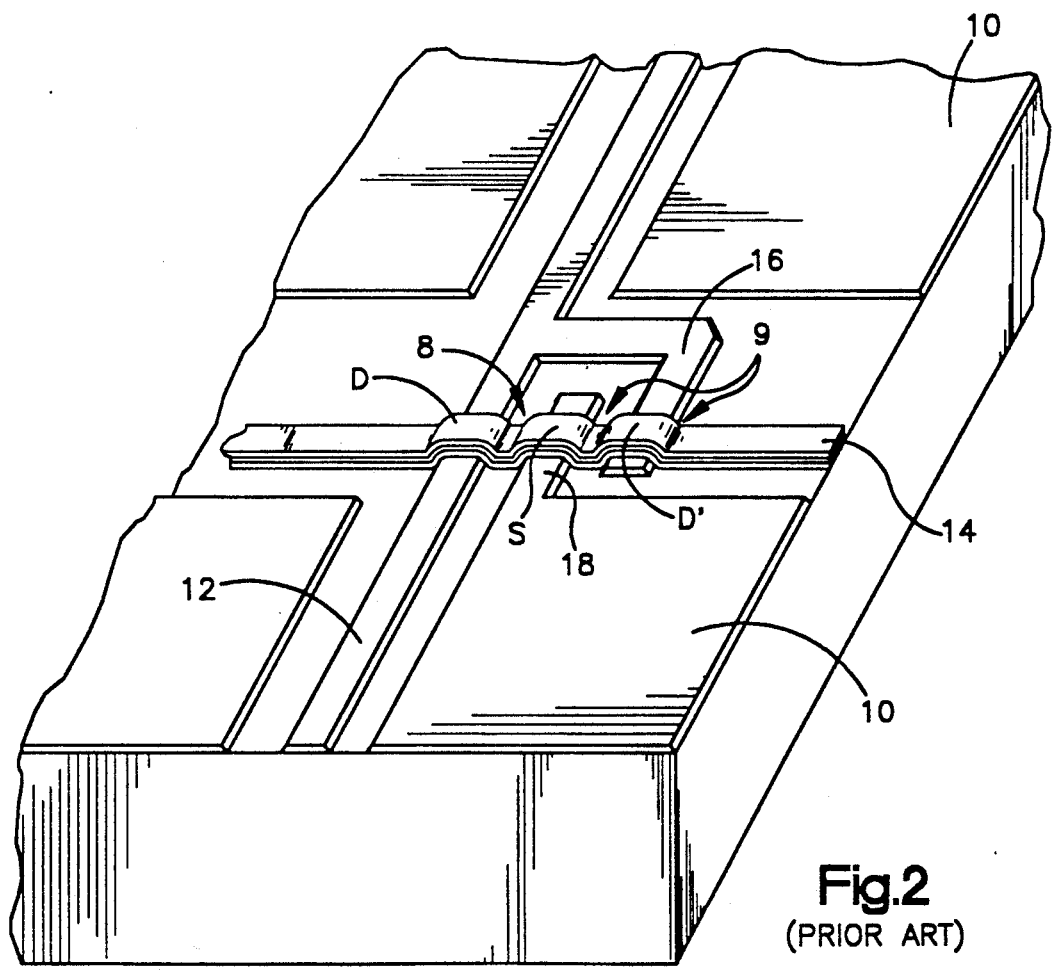
Figure 3:
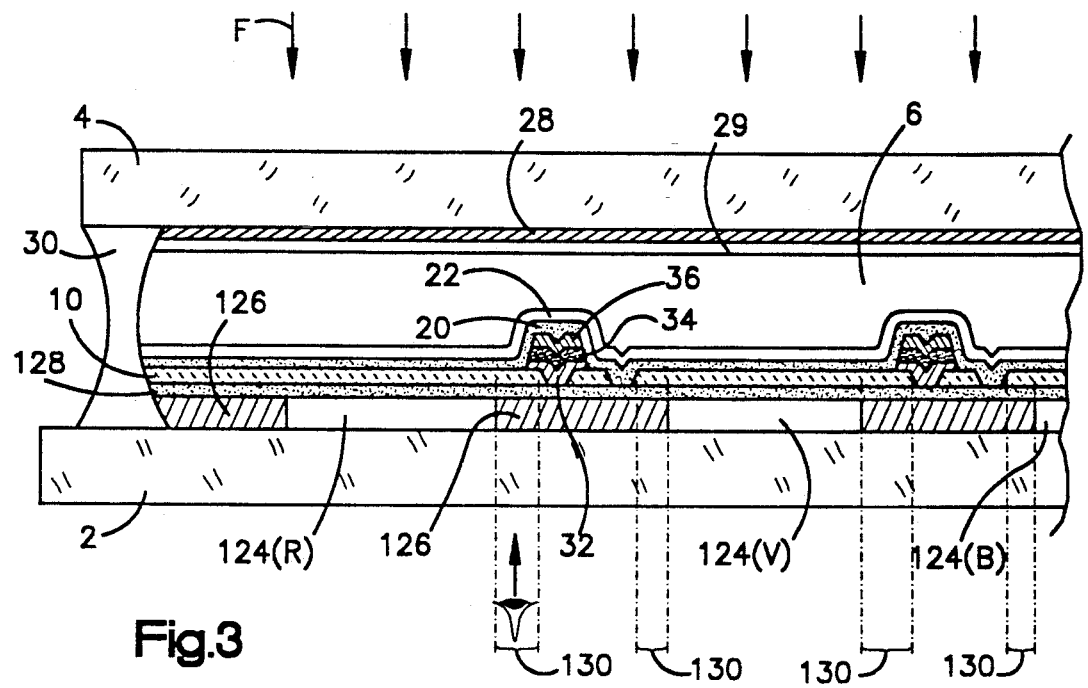
FIGS. 3 and 4 Diagrammatically a colour screen structure according to the invention, FIG. 3 being a longitudinal sectional view and FIG. 4 a part perspective view of the lower screen plate.
Figure 4:
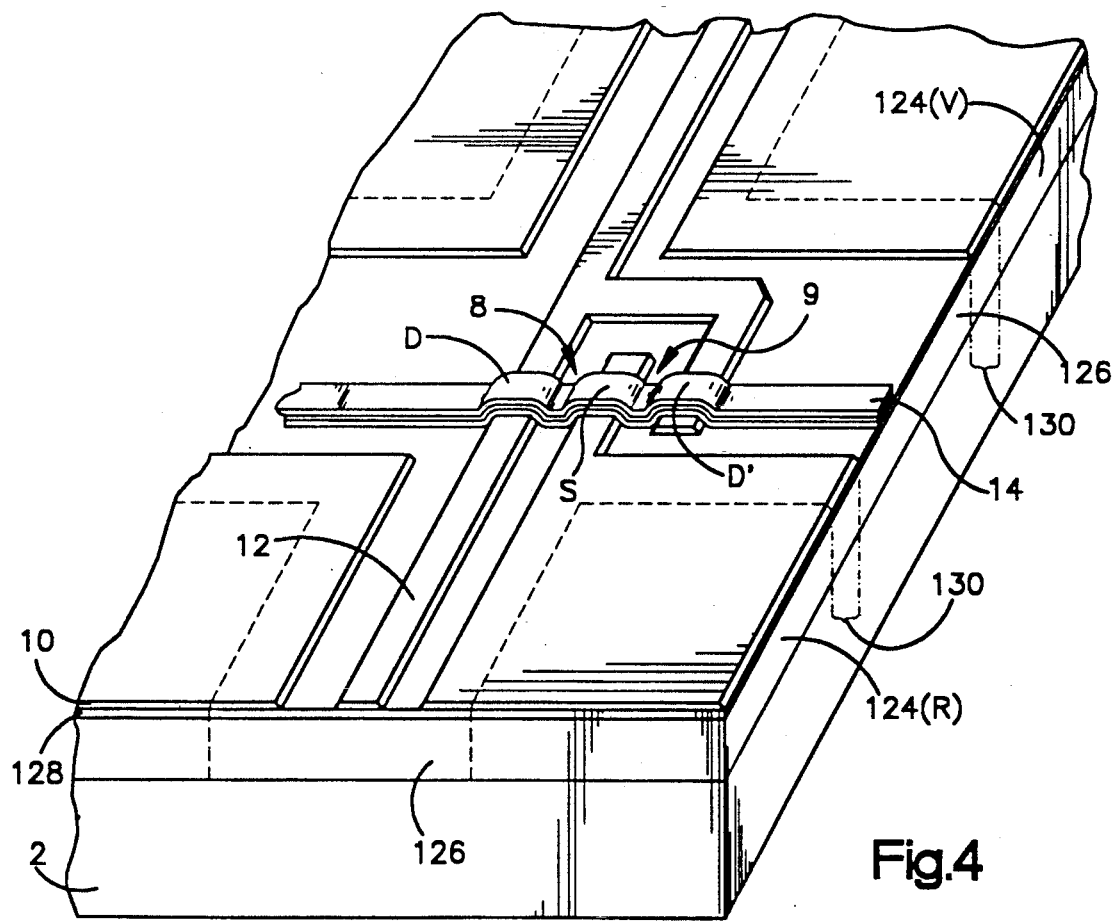

In FIGS. 3 and 4, those parts of the screen or display identical to those of the prior art will carry the same references.

As in the prior art, the screen according to the invention has two facing lower and upper glass plates 2, 4 containing a liquid crystal 6. A peripheral seal 30 seals the edges of the two plates 2 and 4.

According to the invention the front or lower plate 2 supports colour filters 124 separated from one another by absorbant masks or black grids 126. The red R, green V and blue B filters are arranged in alternating manner. They are in the form of blocks and the space between these blocks is filled by the black grid 126. These blocks have a surface at the most equal to that of the electrodes 10 of the pixels.

These colour filters and said black grid have a thickness of 1.2 $\mu$m. They are made from coloured polyimide respectively red, green, blue and black, annealed in an oven at 220° C. These colour filters can be produced in the manner described in SID 87 Digest, pp 379–382 by W. J. Latham et al "A new class of colour filters for liquid crystal displays".

These filters and the black grid can also be produced by sublimating a coloured ink with the aid of thermoelectronic means, as described in the article "High quality organic pigment colour filter for colour liquid-crystal display" by T. Ueno et al, Japan Display 86, pp 320–322.

These two colour filters production procedures are compatible with the process for producing thin film transistors with "two masking levels". In particular, these filters have an excellent surface state and are able to resist high temperatures (typically 200° to 250° C.). In addition, the production process of these filters is compatible with that of the photolithography operations of the "two masking level process".

In order to improve the compatibility of these colour filters 124 with the production of thin film transistors 8 and 9, it is necessary to cover the filters 124 and the black grid 126 with a transparent passivating layer 128. This passivating layer can be made from silicon nitride or preferably amorphous hydrogenated carbon, deposited by chemical vapour deposition.

In particular, the passivating layer is a 0.1 $\mu$m thick amorphous hydrogenated carbon layer, deposited at ambient temperature (25° C.) by plasma assisted chemical vapour deposition (PECVD), the active gas being $CH_4$. This passivating layer covers the entire surface of the filters and the black grid.

On said passivating layer 128 are located the thin film transistors 8, 9, the addressing columns 12, the addressing rows 14 and the pixel electrodes 10. These elements are produced by the so-called "two masking level" process, as described in FR-A-2 503 072.

In particular, the source S and drain D contacts, as well as the control columns 12 and image electrodes 10 are defined in the same 200 nm thick IT layer with a resistivity of 10 ohm$^2$, deposited by magnetron sputtering at ambient temperature.

Moreover, the transistors 8, 9 and the addressing rows 14 are defined by the photolithography of a stack of an amorphous hydrogenated silicon layer 32, a silicon nitride layer 34 and an aluminium layer 36. These layers have respective thicknesses of 15, 300 and 200 nm. The layers 32 and 34 are deposited by PECVD at 180° C. and the aluminium layer by magnetron sputtering at ambient temperature.

The etched aluminium layer inter alia defines the control gates of the transistors.

As shown in FIG. 3, these active elements are covered by a second passivating layer 20 which, as in the prior art, is made from silicon nitride, has a thickness of 50 nm and is deposited by PECVD at 150° C.

This is followed by the orientation layer 22 of the liquid crystal 6. The layer 22 is produced from 0.1 $\mu$m thick transparent polyimide, deposited with a whirler, annealed at 180° C. and then brushed.

According to the invention, the upper or rear glass substrate 4 is directly covered by the counterelectrode 28 in the form of a 200 nm thick, transparent ITO continuous plate covering the entire inner surface of the plate 4 to be used for display purposes. This counterelectrode 28 is deposited by magnetron sputtering and in direct manner on the plate 4.

An orientation layer 29 for the liquid crystal identical to the layer 22 is provided on the inner face of the counterelectrode 28.

It is possible to replace the upper glass plate 4 by a semirigid plate made from a plastics material compatible with the counterelectrode deposition process and compatible with the liquid crystal 6 used.

It would also be possible to envisage replacing the ITO counterelectrode by a transparent, rigid, flexible polymer counterelectrode, such as a polycarbonate or polyamide, covered by an ITO layer.

The assembly of the screen or display structure according to the invention is much simpler and faster than in the prior art, thus making it possible to produce large, high resolution flat-faced screens at a higher speed and lower cost than those of the prior art.

According to the invention, the thin film transistors 8, 9 are produced facing the black grid 126, as well as the rows 14 and columns 12 of the active matrix, whereas the capacitor electrodes 10 are produced above colour filters 124.

The superimposing of the capacitor plate 10 and the filters 124 takes place with a mask aligning means identical to that used for producing the thin film transistor matrix. In this way an alignment precision is obtained better than the $\pm 3$ $\mu$m of the prior art and typically $\pm 1$ $\mu$m.

In addition, the black grid 126 below the "bulges" of the thin film transistors serves as a black matrix, thus preventing ambient light from disturbing the operation of these transistors. This black matrix also has the advantage of being electrically insulating.

Figure 5:
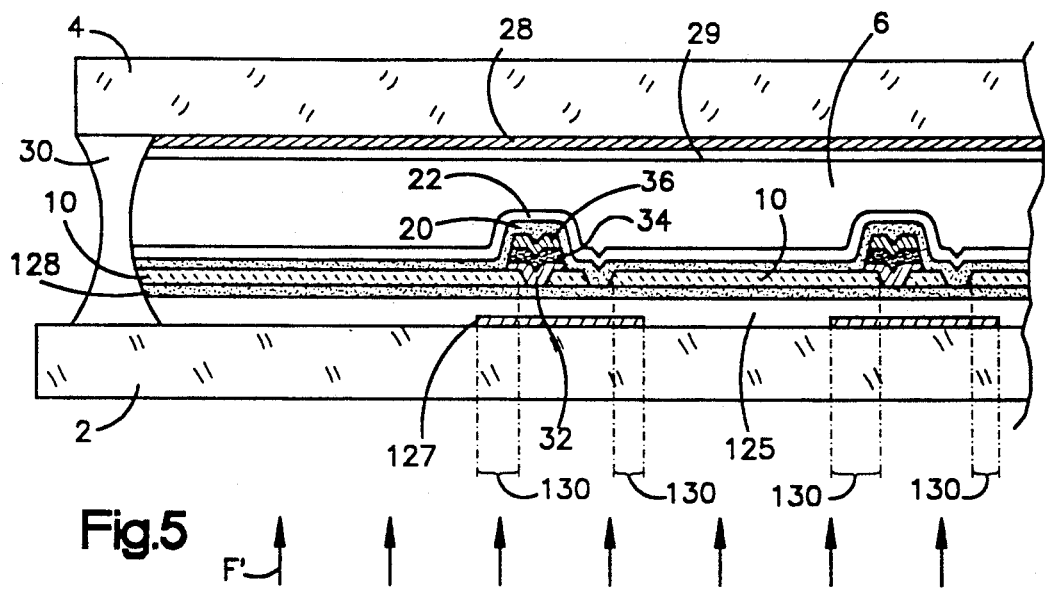
FIGS. 5 and 6 Diagrammatically a black and white screen structure according to the invention, FIG. 5 being a longitudinal sectional view and FIG. 6 a part perspective view of the lower screen plate.
Figure 6:
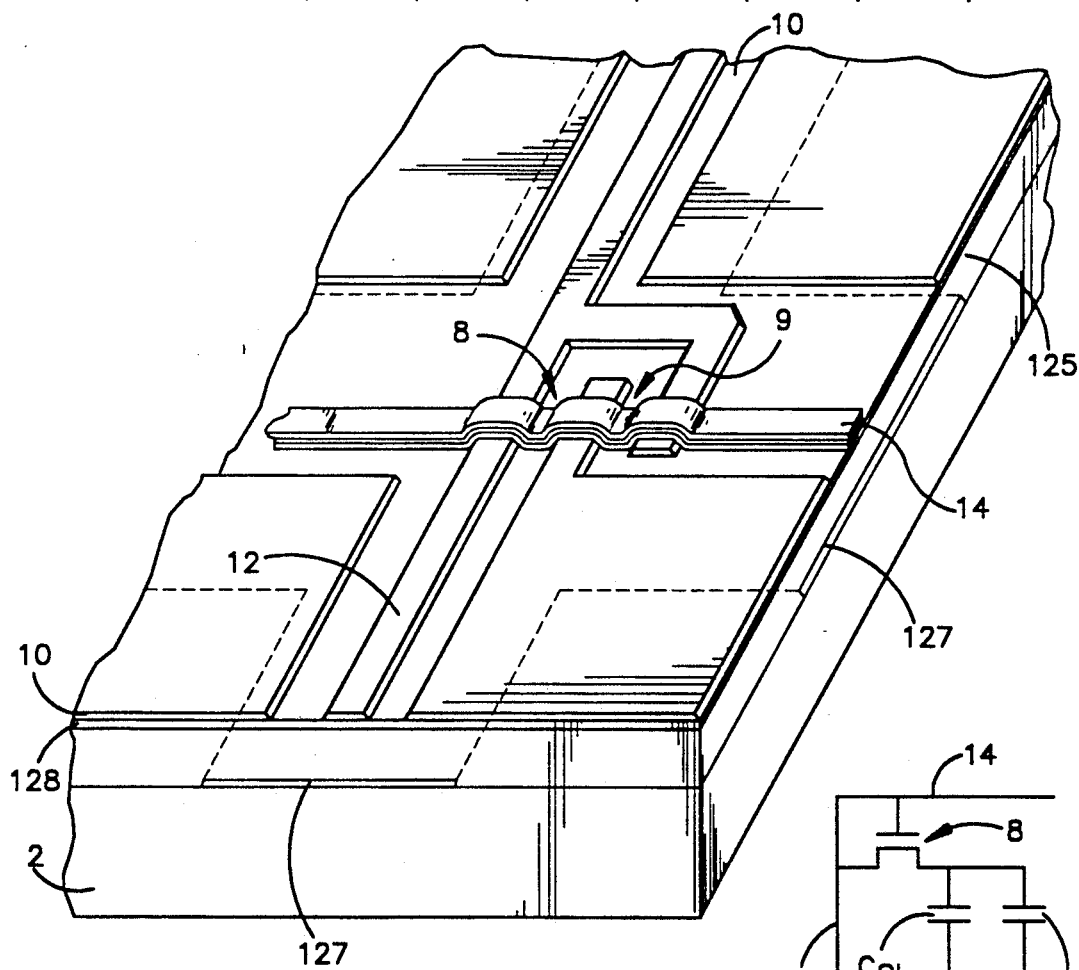

In the case of small screens for projection systems, FIGS. 5 and 6 show that the colour filters and "black grid" are replaced by a metal black matrix 127, which is conductive, e.g. made from chromium or aluminium, shaped like a grid, covered with an insulating layer 125, e.g. uncoloured polyimide or silica and has a thickness of 0.4 μm. The screen structure is otherwise identical to that of the large screens defined in FIGS. 3 and 4. In this type of screen, illumination takes place via the front or lower face, as indicated by the arrows F'.

According to the invention, the black matrixes 126, 127 project beneath the electrodes 10 of the pixels and their overlap 130. In the case of the electricity conducting, metal mask, these overlaps define capacitors $C_{ST}$.

Figure 7:
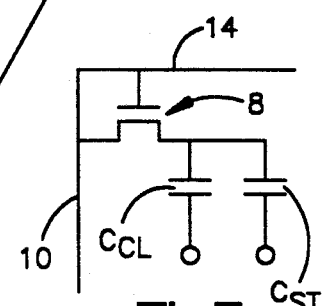
FIG. 7 A circuit diagram of the pixel of the screen structure of FIG. 5.

From an electrical standpoint, said capacitor $C_{ST}$ is in parallel with the liquid crystal capacitor $C_{CL}$, as shown in FIG. 7. This storage capacitor $C_{ST}$ will help to maintain the charge at the terminals of the liquid crystal in the closed state of the transistor, due to the fact that the said capacitor is loss-free.

In the projection application where the transistor will be very highly illuminated, this integrated storage capacitance is a major advantage improving the contrast of the screen, particularly at high temperatures.

Moreover, the use of a highly reflective, black matrix 127 avoids heating of the transistors.

We claim:

1. Active matrix, liquid crystal screen structure having a first and a second transparent substrates (2, 4) spaced from one another and between which is interposed a liquid crystal film (6), the first substrate (2) essentially supporting colour filters (124) resistant to high temperatures and separated by black matrixes (126), a first transparent, passivating layer (128) deposited on the entire surface occupied by the filters and the black matrixes, thin film transistors (8, 9) formed on the first passivating layer facing the black matrixes so as to be protected from the ambient light, first, transparent, capacitor plates (10), formed on the first passivating layer facing the colour filters, each first plate being connected to a thin film transistor, electrode rows (14) and columns (12) for controlling said transistors and a second transparent, passivating layer (20) covering the transistors, the first plates, the rows and the columns, the second substrate (4) essentially having the second transparent capacitor plate (28), said second plates facing the first capacitor plates.

2. Structure according to claim 1, characterized in that the second substrate (4) has a continuous conductive plate (28) serving as a second capacitor plate.

3. Structure according to claim 1, characterized in that the transistors are of the "gate on top" type.

4. Structure according to claim 1, characterized in that the colour filters and black matrixes are able to resist temperatures of at least 180° C.

5. Structure according to claim 1, characterized in that the colour filters and black matrixes are formed in a pigment-containing, cross-linked polyimide layer.

6. Structure according to claim 1, characterized in that the first passivating layer is a chemical vapour deposited, amorphous hydrogenated carbon layer.

7. Structure according to claim 1, characterized in that the filters are in the form of blocks, each filter having a surface at the most equal to that of each capacitor plate.

* * * * *